United States Patent
Kota et al.

(10) Patent No.: US 10,168,999 B2
(45) Date of Patent: Jan. 1, 2019

(54) SOFTWARE OBJECT DEFINITION AND INTEGRATION

(71) Applicant: INTERNATIONAL BUSINESS MACHINES CORPORATION, Armonk, NY (US)

(72) Inventors: Madhavi Kota, Bangalore (IN); Thanmayi Mruthyunjaya, Bangalore (IN); Aparna Srinivasan, Bangalore (IN); Siddalinga M. Swamy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/604,731

(22) Filed: May 25, 2017

(65) Prior Publication Data

US 2018/0341463 A1    Nov. 29, 2018

(51) Int. Cl.
| | |
|---|---|
| *G06F 9/44* | (2018.01) |
| *G06F 9/45* | (2006.01) |
| *G06F 9/46* | (2006.01) |
| *G06F 8/30* | (2018.01) |
| *G06F 8/73* | (2018.01) |

(52) U.S. Cl.
CPC . *G06F 8/30* (2013.01); *G06F 8/73* (2013.01)

(58) Field of Classification Search
CPC ......... G06F 17/30554; G06F 17/30312; G06F 17/2247; G06F 17/30575; G06F 9/4493; G06F 9/4488; G06F 9/4494; G06F 8/30; G06F 8/73; G06F 8/41; G06F 8/315; A63F 13/798; A63F 13/00; A63F 13/12; A63F 13/35; A63F 13/60
See application file for complete search history.

(56) References Cited

U.S. PATENT DOCUMENTS

| | | | |
|---|---|---|---|
| 8,656,365 B2 * | 2/2014 | Rama | G06Q 10/06 |
| | | | 717/126 |
| 8,949,806 B1 * | 2/2015 | Lee | G06F 8/445 |
| | | | 711/170 |
| 9,075,833 B2 | 7/2015 | Gao et al. | |
| 9,100,345 B2 | 8/2015 | Kothamasu et al. | |
| 9,483,240 B1 * | 11/2016 | Boyar | G06F 8/38 |

(Continued)

OTHER PUBLICATIONS

Michael Droettboom, Structuring a complex schema, Dec. 2016, 3 pages.*

(Continued)

*Primary Examiner* — Thuy Dao

(74) *Attorney, Agent, or Firm* — Schmeiser, Olsen & Watts; William H. Hartwell

(57) ABSTRACT

A method and system for improving software object definition is provided. The method includes receiving a software object from a hardware and software connector device and parsing top level hierarchal software structures of the software object. The top level hierarchal software structures are mapped to specified software element properties and in response a container memory structure is identified. A search process for the container memory structure is executed and based on the results software building block code is executed thereby modifying the first container memory structure resulting in an improved operation of the hardware and software connector device and the hardware framework system.

18 Claims, 5 Drawing Sheets

(56) References Cited

U.S. PATENT DOCUMENTS

| | | | |
|---|---|---|---|
| 9,864,582 B2* | 1/2018 | Atreya | G06F 8/33 |
| 9,990,187 B1* | 6/2018 | Carroll | G06F 8/31 |
| 10,042,740 B2* | 8/2018 | Bird | G06F 11/3672 |
| 2005/0216282 A1 | 9/2005 | Chen et al. | |
| 2011/0153836 A1 | 6/2011 | Ireland | |
| 2014/0207826 A1* | 7/2014 | Gao | G06F 17/30292 |
| | | | 707/803 |
| 2016/0070604 A1 | 3/2016 | Musteata et al. | |
| 2017/0308361 A1* | 10/2017 | Brezinsky | G06F 8/41 |
| 2018/0032355 A1* | 2/2018 | Haupt | G06F 9/4488 |

OTHER PUBLICATIONS

Yu et al., FreeFlow: High Performance Container Networking, 7 pages (Year: 2016).*

Cretella et al., Semantic and Matchmaking Technologies for Discovering, Mapping and Aligning Cloud Providers's Services, 5 pages (Year: 2013).*

Besnard et al., Introducing Task-Containers as an Alternative to Runtime-Stacking, 13 pages (Year: 2016).*

Structuring a complex schema; Retrieved from the Internet Nov. 29, 2016; URL: https://spacetelescope.github.io/understanding-json-schema/structuring.html; 5 pages.

* cited by examiner

SOFTWARE OBJECT DEFINITION AND INTEGRATION

FIELD

The present invention relates generally to a method for generating software object definitions and in particular to a method and associated system for improving software technology associated with enabling connector devices to automatically generate software object definitions and associated software structures.

BACKGROUND

Accurately generating identifiers for defining software typically includes an inaccurate process with little flexibility. Determining software operational solutions with respect to code may include a complicated process that may be time consuming and require a large amount of resources. Accordingly, there exists a need in the art to overcome at least some of the deficiencies and limitations described herein above.

SUMMARY

A first aspect of the invention provides a software object definition improvement method comprising: receiving from a hardware and software connector device, by a processor of a hardware framework system, a first software object; parsing, by the processor, top level hierarchal software structures of the first software object; mapping, by the processor, top level hierarchal software structures to specified software element properties; identifying, by the processor based on results of the mapping, a first container memory structure; searching, by the processor based on results of the identifying, for the first container memory structure; determining, by the processor based on results of the searching, if the first container memory structure has been located; and executing, by the processor based on results of the determining, software building block code thereby modifying the first container memory structure based on the mapping resulting in an improved operation of the hardware and software connector device and the hardware framework system.

A second aspect of the invention provides a computer program product, comprising a computer readable hardware storage device storing a computer readable program code, the computer readable program code comprising an algorithm that when executed by a processor of a hardware framework system implements a software object definition improvement method, the method comprising: receiving from a hardware and software connector device, by the processor, a first software object; parsing, by the processor, top level hierarchal software structures of the first software object; mapping, by the processor, top level hierarchal software structures to specified software element properties; identifying, by the processor based on results of the mapping, a first container memory structure; searching, by the processor based on results of the identifying, for the first container memory structure; determining, by the processor based on results of the searching, if the first container memory structure has been located; and executing, by the processor based on results of the determining, software building block code thereby modifying the first container memory structure based on the mapping resulting in an improved operation of the hardware and software connector device and the hardware framework system.

A third aspect of the invention provides a hardware framework system comprising a processor coupled to a computer-readable memory unit, the memory unit comprising instructions that when executed by the computer processor implements a software object definition improvement method comprising: receiving from a hardware and software connector device, by the processor, a first software object; parsing, by the processor, top level hierarchal software structures of the first software object; mapping, by the processor, top level hierarchal software structures to specified software element properties; identifying, by the processor based on results of the mapping, a first container memory structure; searching, by the processor based on results of the identifying, for the first container memory structure; determining, by the processor based on results of the searching, if the first container memory structure has been located; and executing, by the processor based on results of the determining, software building block code thereby modifying the first container memory structure based on the mapping resulting in an improved operation of the hardware and software connector device and the hardware framework system.

DETAILED DESCRIPTION

Figure 1:
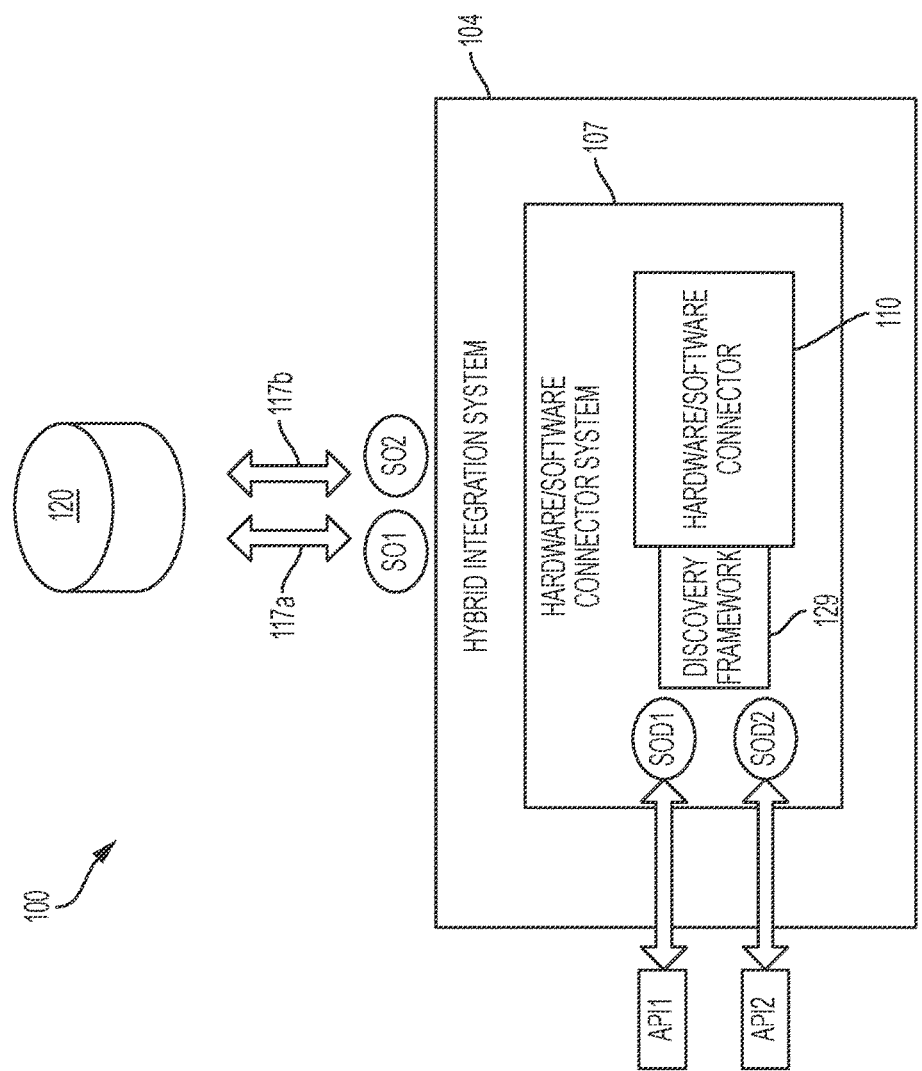
FIG. 1 illustrates a system for improving software technology associated with defining software objects resulting in improved operation of a hardware and software connector device, in accordance with embodiments of the present invention.

FIG. 1 illustrates a system 100 for improving software technology associated with defining software objects resulting in improved operation of a hardware and software connector device 110, in accordance with embodiments of the present invention. System 100 enables a process for improving hardware/software technology by automating and accelerating generation of software object definitions for a hardware and software connector 110 of a hybrid integration system 104. Hardware and software connector 110 is enabled to generate software object definitions without analyzing software object structures thereby accelerating generation of the software object definitions. Additionally required software building blocks are identified efficiently via usage of common software related attributes defining software object metadata thereby enhancing a reliability of a hardware and software connector 110 via software code re-usability.

System 100 (e.g., a hybrid IT system) of FIG. 1 includes a hybrid integration system 104 (i.e., specialized hardware device(s)) and an application database system 120 interconnected through a network 117a and 117b. Hybrid integration system 104 includes a hardware/software connector system 107 that comprises a hardware/software connector device 110 and a discovery framework device 129. Hardware/software connector device 110 is connected to software objects SOD1 and SOD2 via discovery framework device 129. Software objects SOD1 and SOD2 are communicatively connected to API1 and API2, respectively. Hybrid integration system 104 (including hardware/software connector system 107, hardware/software connector device 110, and discovery framework device 129) and application database system 120 may include specialized testing circuitry/logic and a memory system. The memory system may include software applications and software code. Hybrid integration system 104 (including hardware/software connector system 107, hardware/software connector device 110, and discovery framework device 129) and application database system 120 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hybrid integration system 104 and application database system 120 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-3. The specialized discrete non-generic analog, digital, and logic based circuitry may include proprietary specially designed components (e.g., a specialized integrated circuit, such as for example an Application Specific Integrated Circuit (ASIC) designed for only implementing an automated process for improving software technology associated with defining software objects resulting in improved operation of a hardware and software connector device (including hardware/software connector system 107, hardware/software connector device 110, and discovery framework device 129). Network 117a and 117b may include any type of network including, inter alia, a local area network, (LAN), a wide area network (WAN), the Internet, a wireless network, etc. Alternatively, network 117a and 117b may include application programming interfaces (API).

System 100 comprises a common framework for efficiently and effectively executing a process for generating and modifying software object structures for hardware/software connector system 107 deployed within hybrid integration system 104. Hardware/software connector system 107 utilizes software object definitions for each software object for deployment. Hardware/software connector device 110 is enabled to generate the software object definitions for associated software objects. Discovery framework device 129 enables hardware/software connector device 110 to generate software object definitions without analysis. Discovery framework device 129 identifies software building blocks within the software object structure that represent the software object definitions. The software building blocks are identified via common software attributes defining software object metadata. The software building blocks enable discovery framework device 129 to construct the software object definitions required for hardware/software connector system 107.

System 100 enables discovery framework device 129 to facilitate a rapid hardware and software connector development process by reducing a complexity of analyzing the software object structures. Discovery framework device 129 improves a reliability of hardware/software connector system 107 by reusing software code for execution. System 100 enables:

1. A common hardware and software framework for constructing software object definitions across multiple hardware and software connectors.
2. Identification of building block containers (i.e., memory structures) for retaining all required software building blocks.
3. Efficient identification of software building blocks via usage of common software attributes for defining software object metadata.

System 100 enables hardware/software connector device 110 to receive a software object SO1 and pass it to discovery framework device 129. In response, discovery framework device 129 generates a software object definition SOD1 by identifying software building block containers and software building blocks defining metadata associated with software object SO1. Additionally, hardware/software connector device 110 receives a software object SO2 and passes it to discovery framework device 129. In response, discovery framework device 129 generates a software object definition SOD2 by identifying software building block containers and software building blocks defining metadata of software object SO2. Hardware/software connector system 107 exposes APIs for associated software object definitions.

The following steps describe a process for generating software object definitions:

1. For every software object associated with hardware/software connector device 110, an associated software structure is transmitted to discovery framework device 129. The associated software structure may include, inter alia, a JSON format, an XML format, etc.
2. Discovery framework device 129 parses the associated software object structures for generating software building block containers or memory structures. Software building block containers comprise top level child software objects comprising partial or full mapping to properties, fields, or definitions of the software objects. Additionally, a search for the top level child software objects (within the software building block containers or memory structures) is initiated. If top level child software objects are located, they are parsed for software building block objects to initiate a process for constructing associated software object definitions necessary for executing hardware/software connector system 107. If top level child software object are not located, then an entire software structure for software building block objects is parsed. Software building block objects may comprise child objects that include any of the following names partially or fully mapped to associated software attribute names, length, maxlength, size, min, max, required, nil, type, datatype, default, etc.
3. A standard software object definition is generated from all identified software building blocks.

Figure 2:
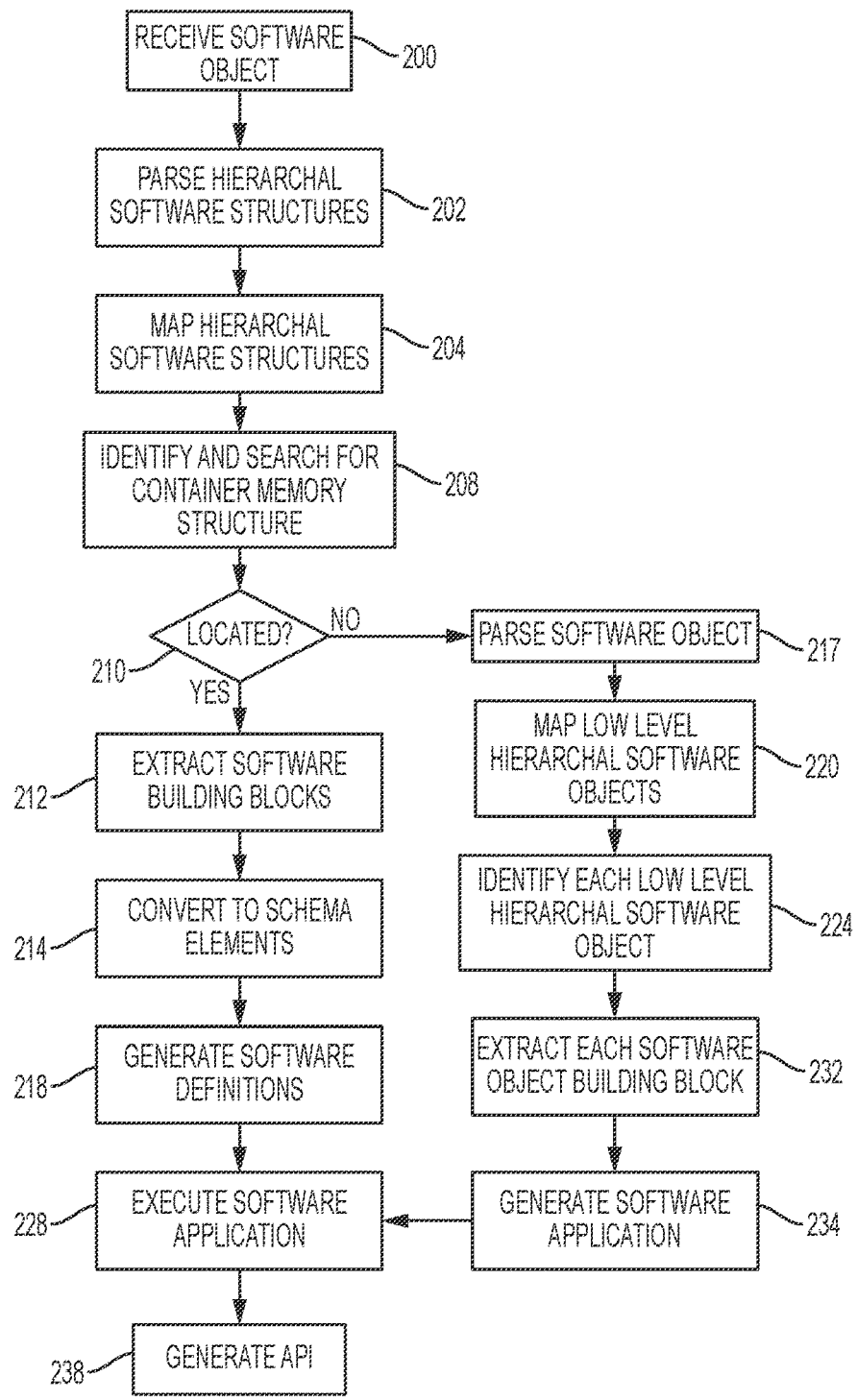
FIG. 2 illustrates an algorithm detailing a process flow enabled by the system of FIG. 1 for improving software technology associated with defining software objects resulting in improved operation of a hardware and software connector device, in accordance with embodiments of the present invention.

FIG. 2 illustrates an algorithm detailing a process flow enabled by system 100 of FIG. 1 for improving software technology associated with defining software objects resulting in improved operation of a hardware and software connector device, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hybrid integration system 104 and/or database system 120 of FIG. 1. In step 200, a first software object is received from a hardware and software connector device. The hardware and software connector device may include, inter alia, a local hardware device, a remote physical hardware device, a virtual device, etc. In step 202, top level hierarchal software structures of the first software object are parsed. In step 204, the top level hierarchal software structures are mapped to specified software element properties. In step 208 a container memory structure is identified based on results of the mapping of step 204. Additionally, a process for searching for the container memory structure is executed. The first container memory structure may include definitions mapped to properties of the hardware and software connector device. In step 210, it is determined (based on results of step 208) if the high level child software object has been located. In step 214, it is determined if the container memory structure has been located. If in step 214, it is determined that the container memory structure has been located then in step 212, software building blocks of the first software object are extracted from the first container memory structure. In step 214, the software building blocks are converted into associated schema elements. In step 218, software definitions needed for communications with the hardware and software connector device are generated from the schema elements. In step 228, software building block code (needed for communications between the software building block code, the hardware framework system, and the software connector device) is executed resulting in an improved operation of the hardware and software connector device and the hardware framework system. Improved operation of the hardware and software connector device and the hardware framework system may include an improved processing speed for the hardware and software connector device and the hardware framework system. Alternatively, improved operation of the hardware and software connector device and the hardware framework system may include an improved memory structure of the hardware and software connector device and the hardware framework system. The improved memory structure may enable an improved access speed for accessing data within the improved memory structure via an internal layered structure of the improved memory structure. In step 238, an application programming interface (API) for communications between the software building block code, the hardware framework system, and the software connector device is generated.

If in step 214, it is determined that the container memory structure has not been located then in step 217, the first software object is parsed into associated software object building blocks comprising low level hierarchal software objects. In step 220, the low level hierarchal software objects are mapped to additional specified software element properties. In step 224, each low level hierarchal software object is identified. In step 232, each associated software object building block of the first software object is extracted. In step 234, a software application comprising each associated software object building block is generated and steps 228 and 238 are executed as described, supra.

Figure 3:
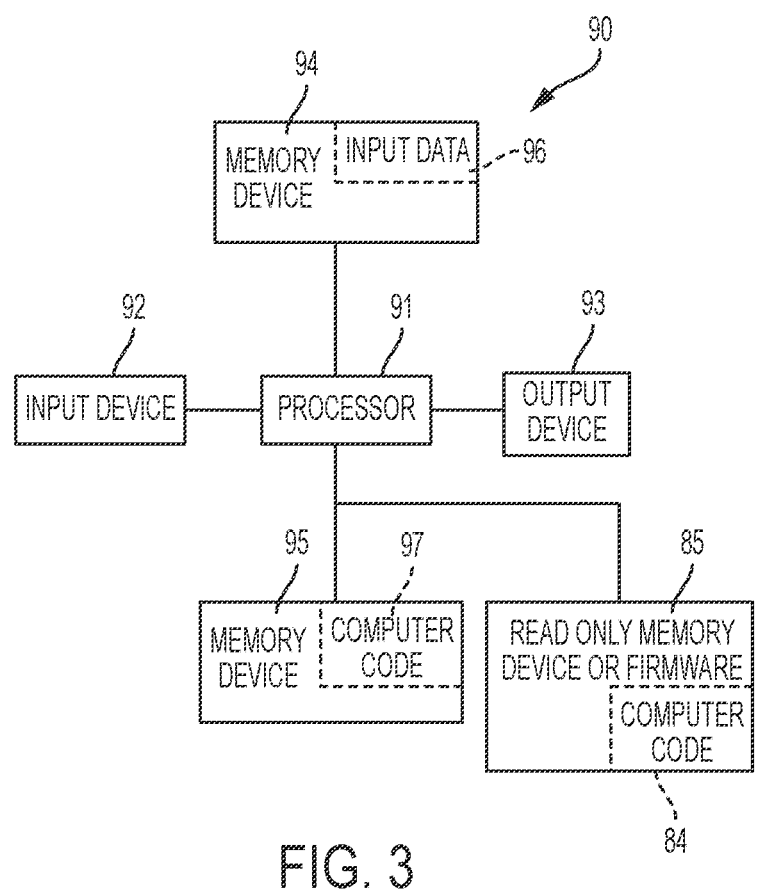
FIG. 3 illustrates a computer system used by the system of FIG. 1 for improving software technology associated with defining software objects resulting in improved operation of a hardware and software connector device, in accordance with embodiments of the present invention.

FIG. 3 illustrates a computer system 90 (e.g., hybrid integration system 104 and/or database system 120 of FIG. 1) used by or comprised by the system of FIG. 1 for improving software technology associated with defining software objects resulting in improved operation of a hardware and software connector device, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 3 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving software technology associated with defining software objects resulting in improved operation of a hardware and software connector device. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to for improve software technology associated with defining software objects resulting in improved operation of a hardware and software connector device. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with defining software objects resulting in improved operation of a hardware and software connector device. In another embodiment, the invention provides a method that performs the process steps of the invention on a subscription, advertising, and/or fee basis. That is, a service supplier, such as a Solution Integrator, could offer to enable a process for improving software technology associated with defining software objects resulting in improved operation of a hardware and software connector device. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
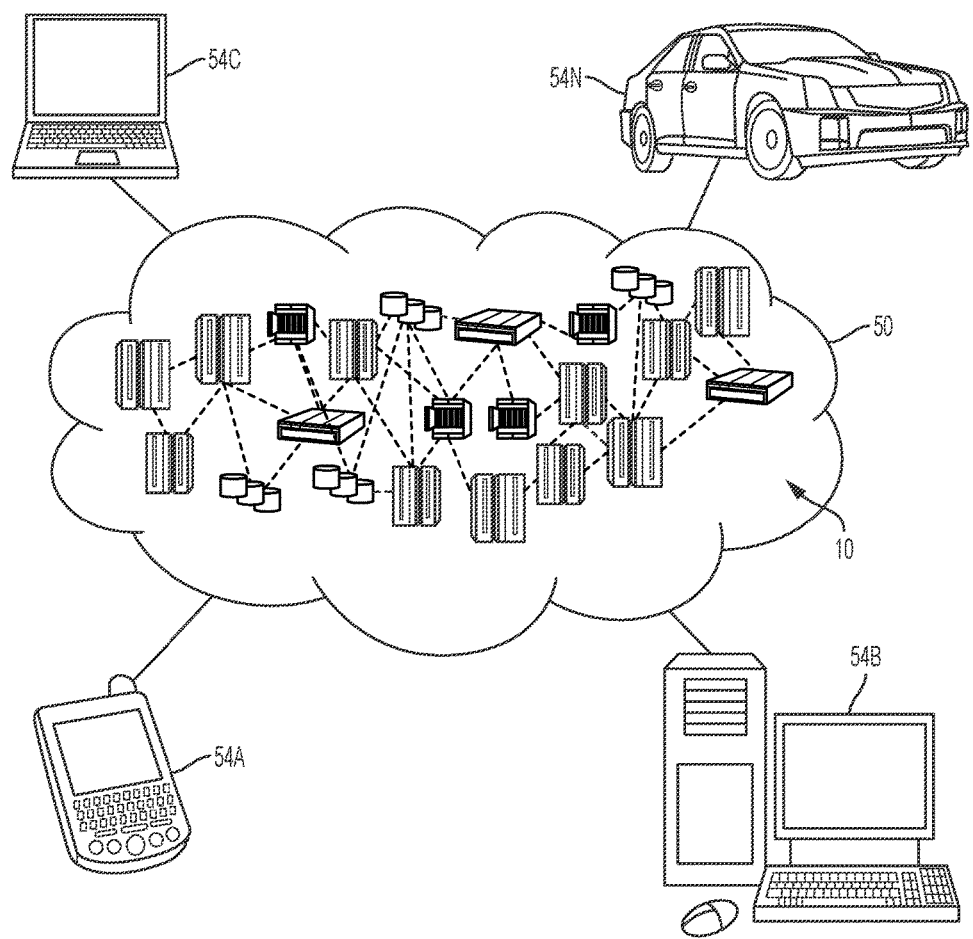
FIG. 4 illustrates a cloud computing environment, in accordance with embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 4 are intended to be illustrative only and that computing nodes 10 and cloud computing environment 50 can communicate with any type of computerized device over any type of network and/or network addressable connection (e.g., using a web browser).

Figure 5:
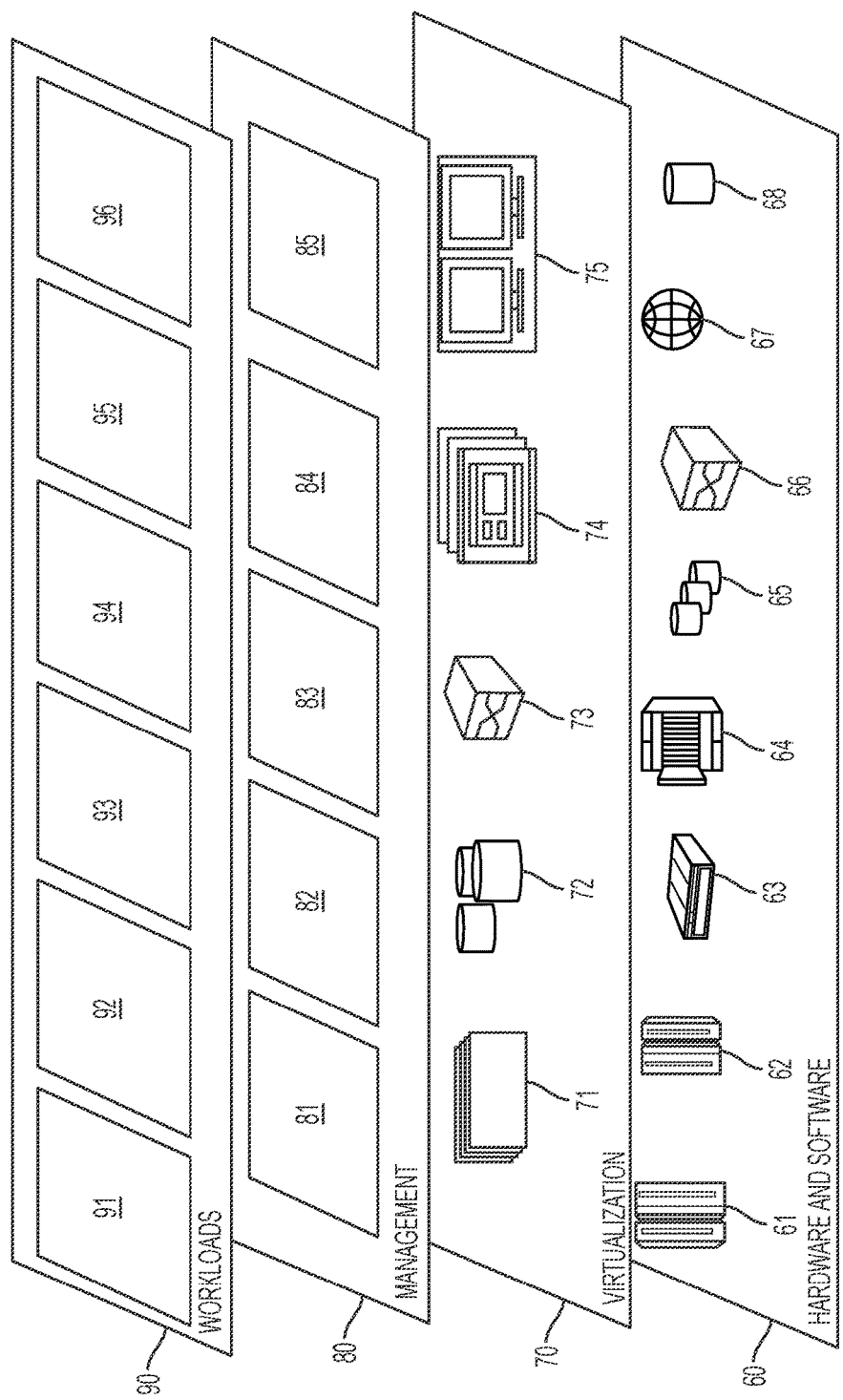
FIG. 5 illustrates a set of functional abstraction layers provided by cloud computing environment, in accordance with embodiments of the present invention.

Referring now to FIG. 5, a set of functional abstraction layers provided by cloud computing environment 50 (see FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving software technology associated with defining software objects 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A software object definition improvement method comprising:
   receiving from a hardware and software connector device, by a processor of a hardware framework system, a first software object;
   parsing, by said processor, top level hierarchal software structures of said first software object;
   mapping, by said processor, top level hierarchal software structures to specified software element properties;
   identifying, by said processor based on results of said mapping, a first container memory structure;
   searching, by said processor based on results of said identifying, for said first container memory structure;
   determining, by said processor based on results of said searching, if said first container memory structure has been located;
   executing, by said processor based on results of said determining, software building block code thereby modifying said first container memory structure based on said mapping resulting in an improved operation of said hardware and software connector device and said hardware framework system; and
   generating, by said processor, an application programming interface (API) for communications between said software building block code, said hardware framework system, and said software connector device.

2. The method of claim 1, wherein said results of said determining indicate said first container memory structure has been located, and wherein said method further comprises:
   extracting, by said processor from said first container memory structure, software building blocks of said first software object; and
   converting, by said processor, said software building blocks into associated schema elements; and
   generating, by said processor from said schema elements, software definitions needed for communications with said hardware and software connector device.

3. The method of claim 1, wherein said results of said determining indicate said first container memory structure has not been located, and wherein said method further comprises:
   parsing, by said processor, said first software object into associated software object building blocks comprising low level hierarchal software objects;
   mapping, by said processor, said low level hierarchal software objects to additional specified software element properties;
   identifying, by said processor, each low level hierarchal software object of said low level hierarchal software objects;
   extracting, by said processor, each said associated software object building block of said first software object; and
   generating, by said processor, a software application comprising each said associated software object building block.

4. The method of claim 1, wherein said first software object comprises structures selected from the group consisting of an XML formatted structure and a JSON formatted structure.

5. The method of claim 1, wherein said first container memory structure comprises definitions mapped to properties of said hardware and software connector device.

6. The method of claim 1, wherein said hardware and software connector device comprises a device selected form the group consisting of a local hardware device, a remote physical hardware device, and a virtual device.

7. The method of claim 1, wherein said improved operation of said hardware and software connector device and said hardware framework system comprises an improved processing speed for said hardware and software connector device and said hardware framework system.

8. The method of claim 1, wherein said improved operation of said hardware and software connector device and said hardware framework system comprises an improved memory structure of said hardware and software connector device and said hardware framework system, and wherein said improved memory structure enables an improved access speed for accessing data within said improved memory structure via an internal layered structure of said improved memory structure.

9. The method of claim 1, further comprising:
providing at least one support service for at least one of creating, integrating, hosting, maintaining, and deploying computer-readable code in the control hardware, said code being executed by the computer processor to implement: said receiving, said parsing, said mapping, said identifying, said searching, said determining, and said executing.

10. A computer program product, comprising a computer readable hardware storage device storing a computer readable program code, said computer readable program code comprising an algorithm that when executed by a processor of a hardware framework system implements a software object definition improvement method, said method comprising:
receiving from a hardware and software connector device, by said processor, a first software object;
parsing, by said processor, top level hierarchal software structures of said first software object;
mapping, by said processor, top level hierarchal software structures to specified software element properties;
identifying, by said processor based on results of said mapping, a first container memory structure;
searching, by said processor based on results of said identifying, for said first container memory structure;
determining, by said processor based on results of said searching, if said first container memory structure has been located;
executing, by said processor based on results of said determining, software building block code thereby modifying said first container memory structure based on said mapping resulting in an improved operation of said hardware and software connector device and said hardware framework system; and
generating, by said processor, an application programming interface (API) for communications between said software building block code, said hardware framework system, and said software connector device.

11. The computer program product of claim 10 wherein said results of said determining indicate said first container memory structure has been located, and wherein said method further comprises:
extracting, by said processor from said first container memory structure, software building blocks of said first software object; and
converting, by said processor, said software building blocks into associated schema elements; and
generating, by said processor from said schema elements, software definitions needed for communications with said hardware and software connector device.

12. The computer program product of claim 10, wherein said results of said determining indicate said first container memory structure has not been located, and wherein said method further comprises:
parsing, by said processor, said first software object into associated software object building blocks comprising low level hierarchal software objects;
mapping, by said processor, said low level hierarchal software objects to additional specified software element properties;
identifying, by said processor, each low level hierarchal software object of said low level hierarchal software objects;
extracting, by said processor, each said associated software object building block of said first software object; and
generating, by said processor, a software application comprising each said associated software object building block.

13. The computer program product of claim 10, wherein said first software object comprises structures selected from the group consisting of an XML formatted structure and a JSON formatted structure.

14. The computer program product of claim 10, wherein said first container memory structure comprises definitions mapped to properties of said hardware and software connector device.

15. The computer program product of claim 10, wherein said hardware and software connector device comprises a device selected form the group consisting of a local hardware device, a remote physical hardware device, and a virtual device.

16. The computer program product of claim 10, wherein said improved operation of said hardware and software connector device and said hardware framework system comprises an improved processing speed for said hardware and software connector device and said hardware framework system.

17. The computer program product of claim 10, wherein said improved operation of said hardware and software connector device and said hardware framework system comprises an improved memory structure of said hardware and software connector device and said hardware framework system, and wherein said improved memory structure enables an improved access speed for accessing data within said improved memory structure via an internal layered structure of said improved memory structure.

18. A hardware framework system comprising a processor coupled to a computer-readable memory unit, said memory unit comprising instructions that when executed by the computer processor implements a software object definition improvement method comprising:
receiving from a hardware and software connector device, by said processor, a first software object;
parsing, by said processor, top level hierarchal software structures of said first software object;
mapping, by said processor, top level hierarchal software structures to specified software element properties;
identifying, by said processor based on results of said mapping, a first container memory structure;
searching, by said processor based on results of said identifying, for said first container memory structure;
determining, by said processor based on results of said searching, if said first container memory structure has been located;
executing, by said processor based on results of said determining, software building block code thereby modifying said first container memory structure based on said mapping resulting in an improved operation of said hardware and software connector device and said hardware framework system; and
generating, by said processor, an application programming interface (API) for communications between said software building block code, said hardware framework system, and said software connector device.

* * * * *